United States Patent
Hoffmann et al.

(10) Patent No.: US 6,523,346 B1
(45) Date of Patent: Feb. 25, 2003

(54) PROCESS FOR CONTROLLING THE COOLING AIR MASS FLOW OF A GAS TURBINE SET

(75) Inventors: Juergen Hoffmann, Rieden (CH); Stefan Rofka, Nussbaumen (CH); René Waelchli, Niedergoesgen (CH)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/993,673

(22) Filed: Nov. 27, 2001

(30) Foreign Application Priority Data

Nov. 2, 2001 (CH) .............................................. 2014/01

(51) Int. Cl.[7] .............................................. F01K 13/02
(52) U.S. Cl. .............................. 60/646; 60/650; 60/657
(58) Field of Search .......................... 60/646, 650, 657; 60/39.07; 415/17, 115, 116

(56) References Cited

U.S. PATENT DOCUMENTS

| | | | | |
|---|---|---|---|---|
| 3,955,360 A | * | 5/1976 | Traut ........................... | 60/39.36 |
| 4,304,093 A | * | 12/1981 | Schulze ....................... | 60/39.07 |
| 4,709,546 A | * | 12/1987 | Weiler ......................... | 60/39.29 |
| 4,767,259 A | | 8/1988 | Kurosawa et al. | |
| 4,840,036 A | * | 6/1989 | Spraker, Jr. .................. | 62/172 |
| 6,161,385 A | * | 12/2000 | Rebhan et al. ............... | 60/646 |

FOREIGN PATENT DOCUMENTS

| | | |
|---|---|---|
| DE | 196 19 836 A1 | 11/1997 |
| DE | 199 07 907 A1 | 8/2000 |
| DE | 100 41 413 A1 | 3/2001 |
| EP | 0 203 353 A1 | 12/1986 |
| EP | 0 515 995 A2 | 12/1992 |
| EP | 0 620 362 B1 | 10/1994 |
| EP | 0 781 909 A2 | 7/1997 |
| EP | 0 995 891 A2 | 4/2000 |
| EP | 1 028 230 A1 | 8/2000 |
| GB | 2 175 048 A | 11/1986 |
| JP | 55-112826 | 9/1980 |
| JP | 05-059965 | 3/1993 |
| WO | WO 97/43530 | 11/1997 |

OTHER PUBLICATIONS

Smith, Elliott, *Wet Compression: Gas Turbine Power Output Enhancement for Peak–Load Demand*, Power Journal, Apr. 2000, pp. 29–32, Siemens AG, Germany.

* cited by examiner

*Primary Examiner*—Hoang Nguyen
(74) *Attorney, Agent, or Firm*—Burns, Doane, Swecker & Mathis, L.L.P.

(57) ABSTRACT

The invention gives a process for the control of the amount of cooling air of a gas turbine set (1, 2, 3). Suitable means (32, 33) are provided in the cooling system (26, 27) to enable the amount of cooling air to be varied. The control of this means takes place in dependence on an operating parameter (X). This is determined in a computer unit (22) by suitable combination of measured machine data (p1, p2).

36 Claims, 5 Drawing Sheets

PROCESS FOR CONTROLLING THE COOLING AIR MASS FLOW OF A GAS TURBINE SET

TECHNICAL FIELD

The invention relates to a process according to the preamble of claim 1.

STATE OF THE ART

Intermediate cooling in the compressor of a gas turbine set is a well-known measure which can substantially contribute to an increase of the efficiency factor and the performance of a gas turbine set, particularly when the heat removed from the partially compressed working medium can be usefully employed at a place in the power station. EP 515 995 proposes in this regard to conduct the compressor air through a steam generator, and thus to produce an amount of steam which can be further used in the water-steam circuit of a combination plant. EP 781 909 and EP 898 645 propose supersaturating the air with water at the compressor inlet, so that a binary air-water-steam mixture enters the compressor. The successive evaporation of the water droplets introduced into the compressor leads to an intensive internal cooling of the compressor; the resulting steam is expanded in the turbine of the gas turbine set, with delivery of power.

Besides a significant reduction of the power uptake of the compressor, the result of a simple consideration of stage kinematics of the compressor is that the intermediate cooling furthermore leads to a displacement of the pressure build-up in the rear compressor stages. The article, "Wet Compression: Gas Turbine Power Output Enhancement for Peak-Load Demand", Siemens Power Journal 1/2000, pages 29–32, states in this regard that this leads to a disequilibrium between the compressor bleed pressures for the cooling air and the turbine pressures which correspond to these. It is proposed on the one hand to correspondingly adjust the diaphragms built into the cooling system for cooling air mass flow adjustment. Alternatively, it is proposed to provide an automatic cooling air regulating system.

With regard to the first proposed variant, it is to be stated in this connection that this leads, in operation without compressor cooling, to a cooling air mass flow which is far above what is required, markedly limiting the power and efficiency factor potentials of the gas turbine set. With regard to the second proposed variant, it is to be stated that the document gives no hint as to how such a control system would be implemented.

DESCRIPTION OF THE INVENTION

The present invention has as its object to provide a process for regulating the cooling air supply of a gas turbine set, avoiding the disadvantages of the state of the art.

This is attained by the totality of the features of claim 1.

The core of the invention is thus, on the one hand to provide the cooling system of a gas turbine with suitable means which make possible a targeted external influence on the cooling air mass flow which flows there, and to control these means in dependence on a suitable operating parameter. This operating parameter contains, in one embodiment, which in particular finds application in variable compressor cooling, principally magnitudes which decisively affect or directly reproduce the pressure distribution and the mass flows in the cooling air system, or respectively around the cooling air system. The operating parameter can furthermore contain magnitudes which supply a measure for the hot gas temperature in the region of the components to be cooled, or for the material temperatures of critical components. The two can also be combined in a suitable manner.

It is to be stated that the process according to the invention is in no way limited to the compensation of fluctuations of the pressure conditions in the cooling system due to different compressor cooling. Likewise, the described process can also find application in order for different load states or thermal loading of critical components to be fulfilled. The process can also be used in dependence on the fuel used or on pressure losses in the main flow path of the gas turbine set: the combustor pressure loss is particularly to be named. This enumeration is to be understood as in no way final, as will be explained hereinafter and also using the embodiment examples.

It is known from EP 1 028 230 to determine a cooling air mass flow by means of a diaphragm measuring point integrated into the cooling air system, and to adjust an adjustable throttle point to a reference mass flow. However, it is found that, precisely in operation with stronger cooling of the flow in the compressor, a control in dependence on cooling air mass flow alone does not give the best result in all circumstances.

A preferred variant of the invention consists in relating the cooling air mass flow to the compressor inlet mass flow. The cooling power in the compressor can then furthermore also be considered as a measure for the shift of the pressure buildup, in a manner which is suitable and which depends on the specific data of the compressor.

The cooling power in the compressor can be determined among other things and in a particularly simple manner by sensing the temperature difference over an intermediate cooler.

The cooling power can also be considered by calculating a supersaturation of the intake air from the ambient conditions, i.e., ambient temperature, pressure and humidity, and also from an amount of water introduced into the supply flow upstream of the compressor inlet.

If water is introduced within the compressor for evaporative cooling, this amount of water can also be made use of as a measure for the cooling power.

This cooling power can be made use of alone or in combination with other magnitudes for forming the operating parameter.

When the mode of determination of the operating parameter is spoken of in this context, this does not at all mean that yet other magnitudes cannot enter into the calculation of the operating parameter besides the explicitly mentioned magnitudes.

A further magnitude which is to be considered in the formation of the operating parameter is the setting of compressor guide blade rows and/or of an adjustable front guide row. The latter is particularly important in the calculation of a compressor inlet mass flow.

A further possibility for forming the operating parameters which is in general easily accessible is to relate the cooling air pressure, i.e., the pressure in the compressor at the place of cooling air bleed, to the compressor outlet pressure or to a further pressure which supplies a reference value for the outlet pressure of the cooling air. This relationship also can be made use of alone or in combination with other magnitudes for forming the relevant operating parameters according to the invention.

Furthermore, the combustor pressure loss can also be made use of for the formation of the operating parameter relevant to the process.

The enumeration of possible combinations for the formation of an operating parameter for the control of the cooling air mass flow is not to be taken as final; depending on the specific circumstances, where the compressor characteristic, the location of cooling air removal, and the kind of compressor cooling possibly implemented, are particularly to be considered; other magnitudes will of course be readily recognized by the skilled person as relevant, and will be considered in the formation of the operating parameter.

The thermal loading of the components to be cooled can be determined by means of a parameter which in particular includes a turbine inlet temperature, a turbine outlet temperature, an amount of fuel, an air mass flow, and/or the compressor outlet pressure, alone or in combination with each other or with other magnitudes.

An advantageous embodiment can be seen in that a turbine inlet temperature, determined in a manner known per se, is to be multiplied by a compressor outlet pressure and related to a cooling air initial pressure, where machine-specific multiplicative factors and exponents are to be used for the individual magnitudes.

In a specific case, the available instrumentation and the accessibility for measurement techniques of a gas turbine set are decisive for the formation of the operating parameter.

The cooling air mass flow can be set either by influencing the flow directly in the cooling air channels, or by influencing a bypass bypassing a throttle point of a cooling air duct of the cooling air system. The influence can be effected here by providing a variable throttling, or by providing means for amplifying the flow with an adjustable driving force. The latter takes place, for example, and with advantage, in that a working fluid inflow to ejectors acting on the cooling air duct or on the bypass is adjusted.

Finally, a supply of an additional fluid downstream of a throttle point arranged in the cooling air duct, for example, an amount of steam taken from a waste heat steam generator, can be controlled in dependence on the selected operating parameter.

In a gas turbine having a high pressure cooling system and at least one cooling system of at least one lower pressure stage, hereinafter termed high pressure and low pressure cooling systems respectively, the invention is implemented in particular in the low pressure cooling system. Then above all, when the gas turbine is operated with variable compressor cooling, the pressure relationships vary strongly in the low pressure cooling system which is indeed supplied with air taken from an intermediate compressor stage, so that an influence on the cooling air mass flow in the low pressure cooling system is particularly advantageous.

An operating parameter constructed according to the invention can furthermore also find application for the control of the variable compressor guide row proposed in DE 199 07 907, the cooling air amount likewise being thereby influenced in the end.

SUMMARY OF THE INVENTION

The invention will be described in detail using examples illustrated in the accompanying drawing. Only simple parameter combinations were selected for explaining the formation of the operating parameter relevant to the invention, for reasons of clarity; the general case will readily become apparent in this light. Details which were unimportant for understanding the invention in connection with an embodiment example have been omitted from the respective Figure. In detail, FIG. 1 shows an embodiment of the invention in a conventional gas turbine, with a combustor and a cooling air feed, the gas turbine set being integrated into a combination plant;

The embodiment examples and Figures are only instructive, and are not to be understood as limiting the invention.

DESCRIPTION OF PREFERRED EMBODIMENTS

Figure 1:
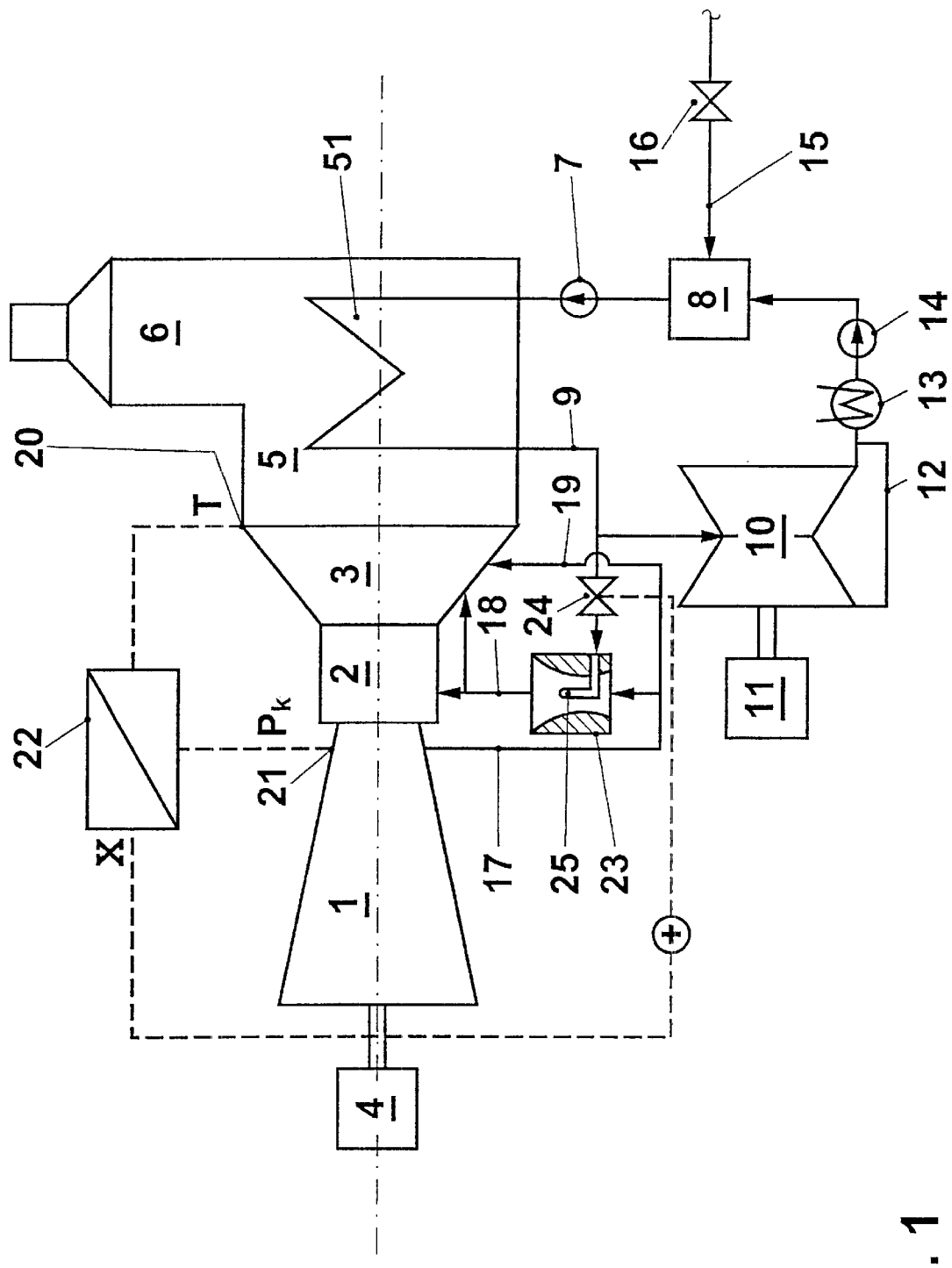

In the example shown in FIG. 1, a gas turbine set is shown according to an embodiment of the invention, integrated into a combination plant. A compressor 1 compresses air to a pressure, and delivers this into a combustor 2. A fuel is burned in the compressed air in the combustor. The resulting hot flue gases flow through a turbine 3, where they provide power to drive the compressor and an external shaft power user such as a generator 4. The expanded flue gases, which are still at a high temperature, pass through a waste heat steam generator 5 and there heat and evaporate a feedwater mass flow, flowing over heating surfaces 51 there, before they flow out into the atmosphere via a chimney 6. On the steam side, a feed pump 7 delivers a water mass flow from a container 8 into the heat exchanger 51, where this water evaporates and the resulting steam is superheated. Live steam 9 flows to a double-pass steam turbine 10, where the steam is expanded. The steam turbine drives a generator 11. The expanded steam 12 flows into a condenser 13. The condensed water is delivered back to the container 8 by a condensate pump 14. The container 8 furthermore has a feed duct for makeup water 15, to compensate for any losses. The makeup water supply can be adjusted by a regulating means 16. This water-steam circuit is shown very simplified; a skilled person knows the possible embodiments, which are however not relevant to the invention in detail. The combustor 2 and the turbine 3 of the gas turbine set are exposed to high thermal loads. The gas turbine set is therefore provided with a cooling system 17 by means of which cooling air flows from the end stages of the compressor to the thermally highly loaded components of the gas turbine set. The cooling system 17 branches into a first branch 18 through which the combustor and the first turbine guide row or the first turbine stage are cooled, and a second branch 19 through which cooling air flows to further turbine stages. The thermal loading of the components in the hot gas path of the gas turbine fluctuates very strongly in dependence on the hot gas temperature in the combustor. The hot gas temperature cannot in practice be directly determined in the combustor or in the first turbine stages by a direct measurement. The gas turbine shown therefore has a temperature measuring point 20 at the turbine outlet and a pressure measuring point 21 at the compressor outlet. The magnitudes pk and T measured there are combined together in a suitable manner in a computer unit 22, and an operating parameter X is formed from them and represents, for example, the turbine inlet temperature. With rising turbine inlet temperature, there is a rise, on the one hand, of the thermal loading of the components in the hot gas path and, on the other hand, of the pressure and temperature gradients over the stages of the turbine 3. As a result, in particular, the pressure drop available to the branch 19 of the cooling system rises, so that in the case shown as an example, the rise of the hot gas temperature of the second and third turbine stages is about compensated by a higher cooling air mass flow in the branch 19. On the other side, the outlet pressure of the branch 18 of the cooling system is always close to the compressor outlet pressure, while the hot gas temperature in this region can vary drastically. An ejector 23 is therefore arranged in this branch 18. A variable amount of live steam 9 can be supplied via a regulating means 24 to a driving nozzle 25 of the ejector, so that the ejector drives a variable amount of additional cooling air through the branch 18 of the cooling system. The regulating means 24 is controlled in dependence on the operating parameter X, such that the regulating means 24 is opened when the turbine inlet temperature rises, and thus the amount of driving steam for the drive nozzle 25 rises. This embodiment of the invention can be implemented without the high apparatus cost of a combination circuit, in that only a small, simple steam generator is built into the exhaust gas train of a gas turbine. The required steam mass flow typically amounts to only a few percent of the cooling air mass flow, for example, 2%–5%. Since the required pressures of the driving steam are hot too high, a sufficient superheating of the steam can already be attained at a quite low steam temperature. The invention can therefore, in connection with steam as the working medium, also be implemented without a waste heat steam generator if, as proposed in DE 100 41 413, cooling air coolers are embodied as steam generators, or if, as proposed in EP 515 995, heat to be withdrawn in an intermediate cooler of the compressor is used for steam generation.

In the embodiment shown in FIG. 1, the control of the cooling air can also advantageously take place in dependence on the combustor pressure loss, alone or in combination with other magnitudes.

Figure 2:
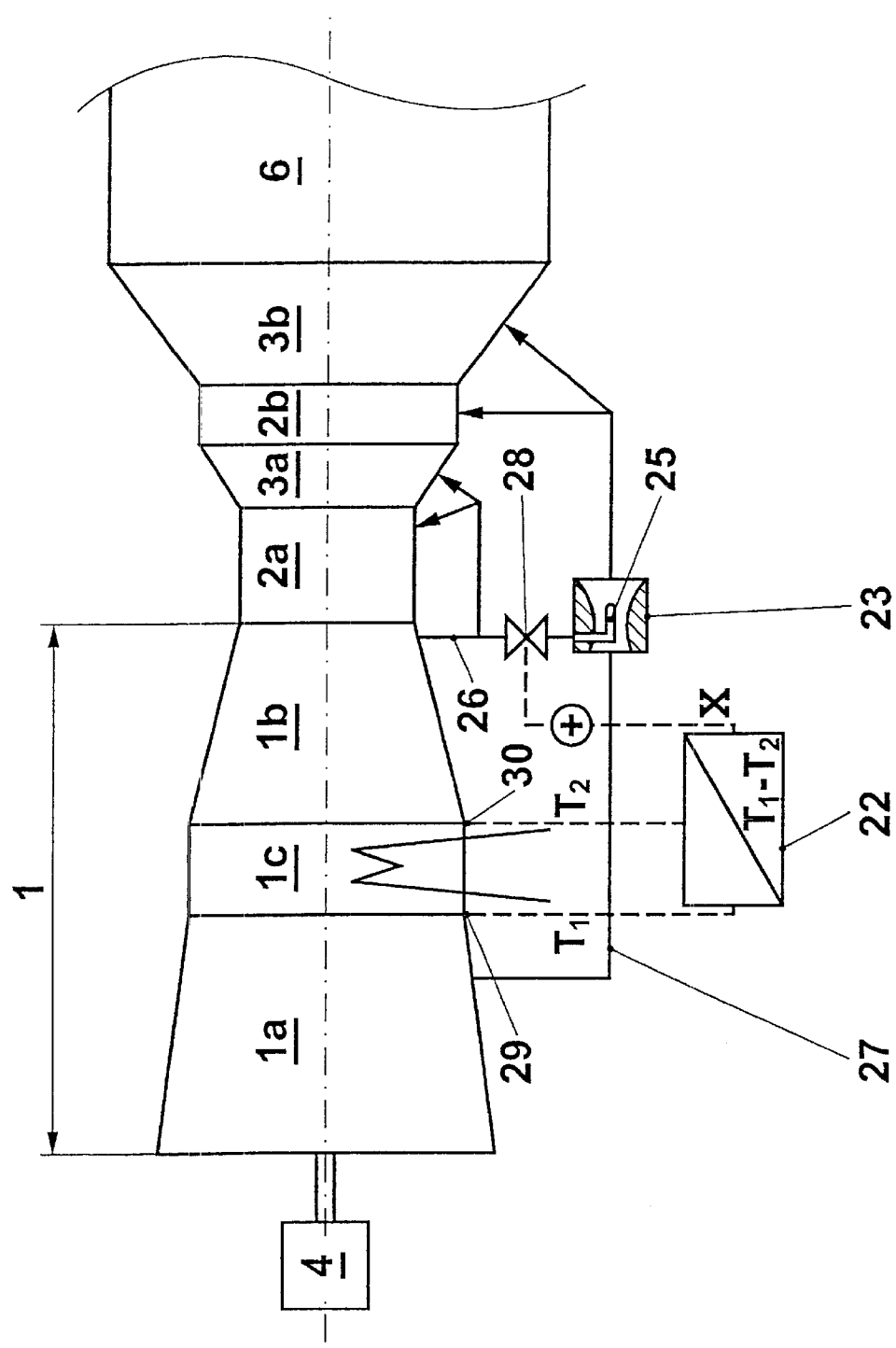
FIG. 2 shows an embodiment of the invention on a gas turbine set with sequential combustion and intermediate cooling in the compressor.

FIG. 2 shows a gas turbine set of the most modern construction, with sequential combustion. Such a gas turbine set is known from EP 620 362. A compressor 1 compresses and delivers air at a high pressure into a first combustor 2*a*, in which the first amount of fuel is burned. The compressed flue gas is partially expanded in a first turbine, high pressure turbine 3*a*, a pressure ratio of 1.5–2 being typically reached, and flows with still higher temperature and high pressure into a second combustor 2*b*. The oxygen content in the flue gas after the first combustor is always still comparatively high, typically 15%–17%. Additional fuel can therefore be readily introduced into the second combustor 2*b* and burned. The after-heated hot gas is expanded in a turbine 3*b* almost to ambient pressure, and flows out into the exhaust gas path 6. A waste heat steam generator (not shown) can readily be situated here; gas turbine sets with sequential combustion are in principle quite particularly suitable for applications in combined plants. On expansion in the turbines 3*a* and 3*b*, the flue gases give up power which serves to drive the compressor 1 and a generator 4. On the basis of the high pressure ratio implemented in such a gas turbine set, the cooling system is embodied in at least two parts, in the present illustrated case with a high pressure cooling system 26 and a low pressure cooling system 27. The high pressure cooling system 26 branches air from the compressor outlet and uses it for cooling the first combustor 2*a* and the high pressure turbine 3*a*. The low pressure cooling system 27 branches air from an intermediate compressor stage, and uses it for cooling the second combustor 2*b* and the low pressure turbine 3*b*. The division of the cooling system into two portions makes it possible to supply the high pressure portion of the hot gas path with cooling air at a high pressure, and thereby to avoid strong throttling, with attendant losses, of the high pressure cooling air for cooling the low pressure section of the hot gas path. The compressor 1 is divided into a first partial compressor 1*a* and a second partial compressor 1*b*, between which an intermediate cooler 1*c* is arranged. By the operation of the intermediate cooler 1*c*, the power needed to drive the compressor is reduced, so that the efficiency factor and the effective work of the gas turbine set rise. This effect can also be attained by water injection into the compressor or a supersaturation of the intake air with moisture, effecting an intensive internal cooling of the compressor due to the evaporation of this moisture. The cooling of the air in the compressor has yet another effect: as the skilled person determines by a simple consideration of stage kinematics, when operating with an intermediate cooling in the compressor, the pressure buildup is shifted into the rear compressor stages. While the relative pressure buildup over the turbine stages remains to a good approximation unchanged, the pressure buildup in the compressor stages is clearly displaced into the second partial compressor 1*b*. From this there results a clear reduction of the working pressure difference over the low pressure cooling system 27, and thence a reduction of the low pressure cooling air mass flow. If the low pressure cooling system 27 is dimensioned such that the cooling air mass flow is sufficient in each case during operation with cooling in the compressor, this leads during operation without compressor cooling to a clear over-cooling, admittedly not primarily injurious, of the low pressure hot gas path, thus here of the units 2*b* and 3*b*, with negative consequences for performance and efficiency factor. Therefore according to the invention an ejector 23 is arranged in the low pressure cooling system, with its ejector nozzle 25 connected to the high pressure cooling system via a regulating means 28. A first temperature measuring point 29 and a second temperature measuring point 30 are arranged directly upstream and downstream of the intermediate cooler 1*c*, and a temperature T1 at the inlet into the intermediate cooler and a temperature T2 at the outlet from the intermediate cooler are determined. The computer unit 22 calculates the temperature drop T1–T2, and forms from this the operating parameter X, which can be made use of as a measure of the cooling power. The operating parameter X acts on the regulating means 28. With increasing cooling power, the pressure buildup is shifted into the second partial condenser 1*b*, so that a smaller initial pressure is available to the low pressure cooling system 27. With an increasing value of the operating parameter X, the regulating means 28 is therefore opened according to a predetermined characteristic, and a partial flow of the high pressure cooling air flows out of the high pressure cooling system 26 as working medium for the working nozzle 25 of the ejector 23. The mass flow in the low pressure cooling system 27 is thereby again raised. In a known manner, this system even operates in a self-regulating manner: to the extent that the pressure buildup in the second partial compressor 1*b* is shifted, the pressure drop available for the working fluid flow of the ejector rises, so that the effect of the drive in the low pressure cooling system is automatically supported. The operating parameter X, which in this case represents a measure of a cooling power in the compressor, can be entirely calculated from a water mass flow introduced into the compressor, or upstream of the compressor into its intake air; in the latter case, a mass flow has to be determined so that the intake air is supersaturated. This water mass flow introduced in the liquid aggregate state into the compressor then substantially determines the cooling power, and can thus be likewise meaningfully applied as the operating parameter X. Similarly to an intermediate cooling, the adjustment of several guide rows can also effect a shift of the pressure buildup in the compressor, which can likewise be compensated in relation to the cooling air mass flows by the use of means in the cooling air channels, such as ejectors, effecting a pressure increase. The embodiment shown here can of course be readily combined with, for example, a control of the amount of cooling air in the high pressure cooling system as shown in FIG. 1.

Figure 3:
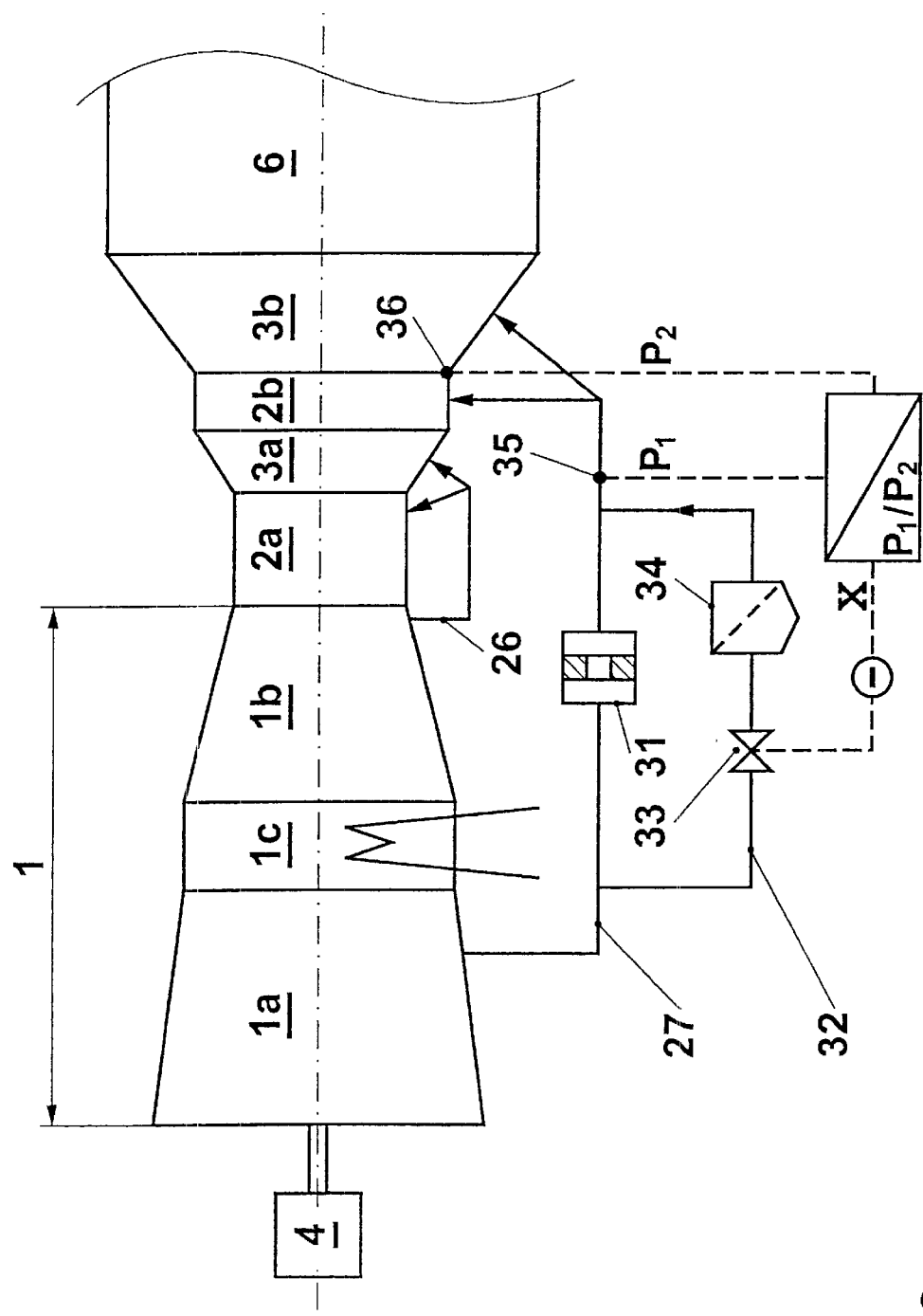
FIG. 3 shows an embodiment example very similar to FIG. 2, with variable cooling air bypass throttling.

A further possibility of the setting of the cooling air mass flow in the low pressure cooling system is shown in FIG. 3. A diaphragm 31 is arranged in the low pressure cooling system 27 as a throttle point. Such a throttle point for defined setting of the cooling air mass flows is usually found in the high pressure cooling system 26, and in the cooling systems of the embodiments explained hereinabove; these diaphragms are of course not relevant there to the invention, and are therefore not shown in the Figures. A bypass duct 32 branches upstream of the diaphragm 31 from the low pressure cooling system, and opens into this again downstream of the diaphragm. This bypass channel is normally so dimensioned that only a fraction of the total cooling air amount flows through it, but is sufficient, in operation with compressor cooling, to compensate for the reduced flow in the main flow channel resulting from the reduction of the driving pressure drop. Such a bypass channel it typically designed for mass flows which amount to less than 80% of the mass flow in the bypassed channel; in particular, nominal mass flows in the range of 20% to 50% of the main mass flow are attained here, values of 10% and less being possible according to the required dynamics of the control. A regulating means 33 is arranged in the bypass channel 32 in order to be able to vary the bypass flow. Such a regulating means can in principle also be arranged directly in the main flow channel of the low pressure cooling system 27, with omission of the bypass duct; however, there are advantages in having to adjust only a generally smaller bypass flow instead of the main flow. A sieve 34 functions as a retaining device, and prevents debris getting into the cooling system and causing blockages in the case of breakage of the regulating means 33. A first pressure measuring point 35 for the determination of a first pressure pi is arranged in the low pressure cooling system, upstream of the inflow of the cooling air into the components to be cooled. A pressure p2 in the second combustor 2b can likewise be determined by a second pressure measuring point 36. The parameter X determined by the computer unit 22 as the pressure difference p1/p2 [sic] represents a good comparison magnitude for the driving pressure ratio over the film cooling bores of the components to be cooled. The regulating means 33 is acted on in dependence on this pressure ratio. When the pressure ratio falls, the regulating means 33 is opened further, resulting in an increase of the initial pressure p1. The pressure ratio of the cooling air can be very easily regulated to a reference value in this manner; this reference value can of course also be predetermined in dependence on a large number of machine operating data, such as, for example, the gas turbine power or measured temperatures of material and/or hot gas.

Figure 4:
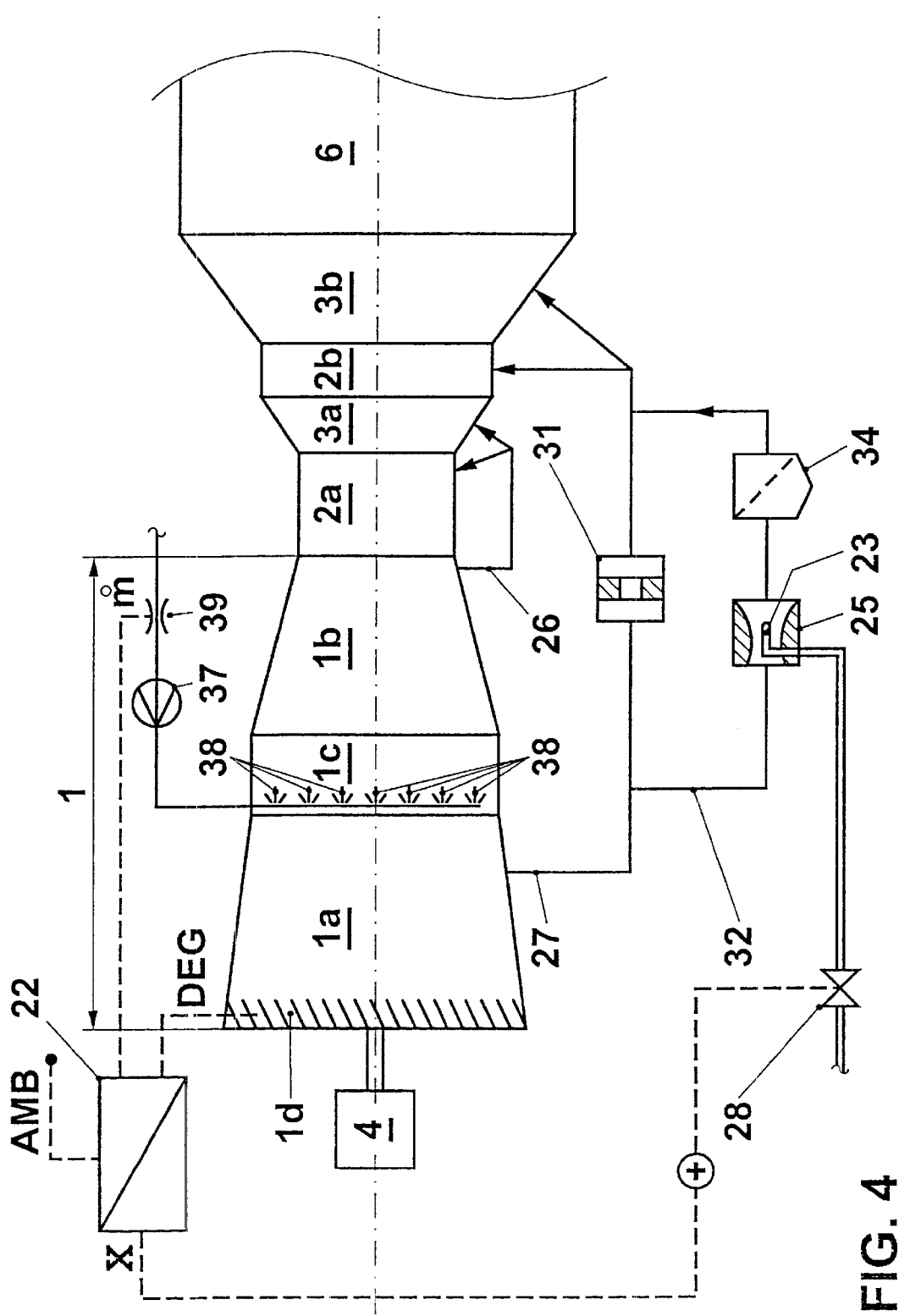
FIG. 4 shows a possible implementation of the invention on a gas turbine set with sequential combustion and compressor injection intermediate cooling, and control of a bypass ejector.

A second possibility for variation of the bypass flow is shown in FIG. 4. Instead of a variable throttle point, an ejector 23 is situated in the bypass channel 32 as means for variable driving of the bypass flow. The choice of the working fluid for the driving nozzle 25 of the ejector is left open. In particular, a small partial flow of the high pressure cooling air is possible as the working fluid; in combination plant and other kinds of plant with steam generators, particularly also when cooling air coolers or compressor intermediate coolers are configured as steam producers, as described in DE 100 41 413 or EP 515 995, an amount of steam can find application as working fluid for the ejector 23. Supply from optional external sources is also in principle possible, but is usually not appropriate. The working fluid mass flow and thus the driving force exerted by the ejector and the bypass mass flow can be adjusted by means of the regulating means 28. The intermediate cooler 1c of the compressor 1 is configured as an injection cooler. A pump 37 delivers a water mass flow under pressure to a number of atomizer nozzles between compressor stages, where this water is introduced into the partially compressed air in the form of fine spray streams 38. The evaporation of the water downstream of the injection point brings about cooling of the air in the compressor. Furthermore, an adjustable front guide row 1d of the compressor is shown; that this is shown in FIG. 4 and not in the foregoing Figures does not at all mean that this would not be present in the other embodiments. It is however relevant for the invention in the embodiment shown here. The introduced water evaporates downstream of the cooler, but partially also still in the second partial compressor 1b. The determination of the cooling power by means of two temperature measuring points is therefore not easily possible. In the present embodiment, the mass flow of the water used for cooling is determined at a throughflow measuring point 39. The air mass flow in the compressor can be determined in dependence on the setting DEG of the front guide row 1d and the ambient conditions AMB. The computer unit 22 determines from these measurement values an operating parameter X, which represents, as the ratio of water mass flow and air mass flow, a reference value for the cooling power. The greater the cooling power, the more marked is the shift of the pressure buildup in the compressor. The regulating means 28 is opened in correspondence with rising operating parameter X, and thus a greater bypass mass flow is driven through the bypass duct 32.

Figure 5:
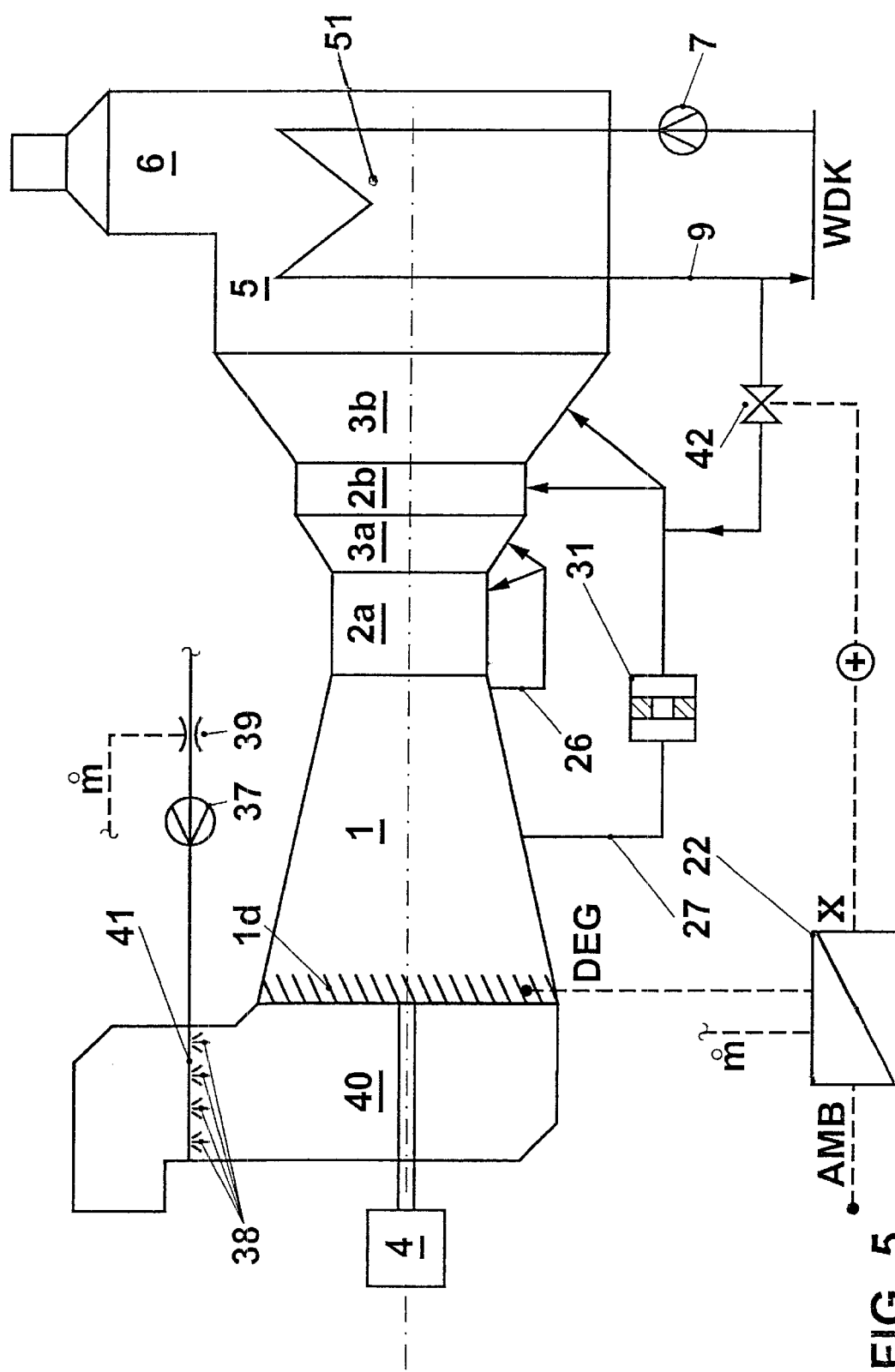
FIG. 5 shows a further example of embodiment of the invention.

FIG. 5 shows a gas turbine set with sequential combustion, which is integrated into a combination power station. The compressor 1 draws air in through an intake channel 40. The compressed air flows into a first combustor 2a. Combustion of a first amount of fuel takes place there. The hot gas is partially expanded in a first turbine 3a, and flows into a second combustor 2b. The hot gas is afterheated there by the combustion of a second amount of fuel, and is further expanded in the turbine 3b. The power of the turbines 3a and 3b is used to drive the compressor 1 and a generator 4. The turbines and combustors are cooled in the manner described hereinabove by a high pressure cooling system 26 and a low pressure cooling system 27. The hot gas from the last turbine 3b flows into a waste heat steam generator 5, and there heats and evaporates, by means of heat exchanger surfaces 51, a water mass flow which is delivered from a water-steam circuit WDK, otherwise not shown in detail; the generated live steam 9 is introduced into the water-steam circuit WDK and there drives a steam turbine in a manner known per se and not relevant to the invention; it could likewise find application as process steam. The exhaust gas, further cooled, flows into the atmosphere through a chimney 6. The compressor 1 does not have an intermediate cooler; instead of this, a water injection device 41 is arranged in the intake channel 40 of the gas turbine set, and by means of it a water mass flow delivered by a pump 37 is introduced in the form of spray streams 38 into the intake air. The water mass flow can then be chosen to be so great that water droplets, that is, water in the liquid state of aggregation, reach the compressor. These water droplets evaporate during the compression process, and thus provide an intensive internal cooling of the compressor. There thereby results, in the same manner as with an intermediate cooling, a shift of the pressure buildup in the compressor 1, and thereby an actual disequilibrium of the pressure conditions in the low pressure cooling system 27. To compensate this, a supply of live steam 9 into the low pressure cooling system downstream of the throttle point 31 is provided in this embodiment. The amount of steam supplied can be varied by means of a regulating means 42. This regulating means 42 is controlled in dependence on an operating parameter X, which is calculated in a computer unit 22 in a suitable manner, for example, from the water mass flow, the ambient conditions AMB and the front guide row setting DEG.

A gas turbine set with only one combustor and only one turbine can of course be equipped with a cooling system with two or more pressure stages. Cooling air coolers can of course also be arranged in the cooling air ducts; in particular, the designs which have ejectors or other controllable means for increasing the pressure in the cooling air ducts have the further advantage of being able to compensate for the pressure losses of the cooling air cooler.

The skilled person readily recognizes that the embodiments shown can be combined together almost optionally within the scope of the invention characterized by the claims. Furthermore he readily obtains from the described determination of the operating parameter the teaching to combine into an operating parameter in a suitable manner the operating parameters of a power station plant which are not explicitly named, and to make use of them for controlling the cooling air supply, without leaving the scope of the subject of the invention as characterized by the claims.

List of reference numerals 1 compressor
1a partial compressor, low pressure compressor
1b partial compressor, high pressure compressor
1d adjustable front guide row
2 combustor
2a first combustor, high pressure combustor
2b second combustor, high pressure combustor
3 turbine
3a first turbine, high pressure turbine
3b second turbine, low pressure turbine
4 generator
5 waste heat steam generator
6 exhaust gas path, stack
7 boiler feed pump
8 feedwater container
9 live steam
10 steam turbine
11 generator
12 expanded steam
13 condenser
14 condensate pump
15 makeup water
16 regulating means for makeup water
17 cooling system
18 first branch of cooling system
19 second branch of cooling system
20 temperature measuring point
21 pressure measuring point
22 computer unit
23 ejector
24 regulating means for ejector working fluid
25 nozzle
26 high pressure cooling system
27 low pressure cooling system
28 regulating means for working fluid of the ejector
29 first temperature measuring point
30 second temperature measuring point
31 diaphragm
32 bypass duct
33 regulating means for bypass duct
34 filter
35 first pressure measuring point
36 second pressure measuring point
37 pump
38 spray streams
39 throughflow measuring point
40 intake channel
41 injection device
42 regulating means for steam
51 heat exchanger surfaces
AMB ambient conditions
DEG front guide row position
m mass flow
p pressure
p1 first pressure
p2 second pressure
pk compressor outlet pressure
T temperature
T1 first temperature
T2 second temperature
WDK water steam circuit
X operating parameter

What is claimed is:

1. A method for controlling a cooling air mass flow in a cooling system of a gas turbine set, said method comprising the steps of:

compressing an air flow from a first pressure to a second pressure by a compressor, said compressor comprising multiple compressor stages;

cooling the air flow while being compressed from the first pressure to the second pressure, applying a cooling power;

determining a quantitative measure for said cooling power;

using said cooling power as an input for computing a cooling air control variable;

varying the cooling air mass flow dependent on said control variable.

2. The method of claim 1, further comprising the steps of:

applying an intercooler to a gas turbine set compressor for applying said cooling power;

measuring the temperature difference over the intercooler;

using said temperature difference as the measure for the cooling power, thus using said measured temperature difference as an input variable for computing the cooling air mass flow control variable.

3. The method of claim 1, further comprising the steps of:

injecting a water mass flow into the air flow of the gas turbine set upstream of at least one compressor stage;

quantifying said water mass flow;

using said water mass flow quantity as the measure for the cooling power, thus using said water mass flow quantity as an input variable for computing the cooling air mass flow control variable.

4. The method of claim 3, further comprising the step of:
injecting the water mass flow upstream of the first compressor stage.

5. The method of claim 4, further comprising the steps of:
measuring the ambient conditions, i.e. ambient air temperature, humidity, and pressure;
calculating the supersaturation of the air upon entry into the first compressor stage from the ambient conditions and the water mass flow quantity;
using the supersaturation as the measure for the cooling power, thus using the supersaturation as an input variable for computing the cooling air mass flow control variable.

6. The method of claim 1, the method further comprising the step of:
adjusting a throughflow of an adjustable throttling device in a cooling air duct of the cooling system dependent on said control variable.

7. The method of claim 1, the method further comprising the steps of:
bypassing a throttling point in a cooling air duct in a bypass duct;
arranging an adjustable throttling device in said bypass duct;
adjusting the throughflow of said adjustable throttling device dependent on the control variable.

8. The method of claim 1, the method further comprising the steps of:
bypassing a throttling point in a cooling air duct in a bypass duct;
placing an ejector in the bypass duct for driving the cooling air mass flow through the bypass duct;
operating said ejector by a motive fluid flow;
adjusting the motive fluid flow dependent on the control variable.

9. The method of claim 1, the method further comprising the steps of:
arranging an entry point for a supplemental fluid downstream of a throttling point in the cooling air duct;
introducing a supplemental fluid at said entry point;
adjusting the flow of the supplemental fluid dependent on the control variable.

10. The method of claim 1, the method further comprising the steps of:
placing an ejector device in a cooling air duct for driving the cooling air mass flow through the cooling air duct;
operating the ejector with a motive fluid flow;
adjusting the motive fluid flow depending on the control variable.

11. The method of claim 1, the method further comprising the steps of:
equipping the gas turbine set with a high pressure cooling system and at least one lower pressure cooling system;
controlling the cooling air mass flow through at least one lower pressure cooling system.

12. The method of claim 11, wherein the cooling air mass flow through the high pressure cooling system is adjusted by means of a fixed throttling device, and the cooling air mass flow of at least one lower pressure cooling system is controlled depending on the control variable.

13. A method for controlling a cooling air mass flow in a cooling system of a gas turbine set, said method comprising the steps of:
compressing an air flow from a first pressure to a second pressure by a compressor, said compressor comprising multiple compressor stages;
quantifying the cooling air mass flow;
quantifying an inlet air mass flow as the mass flow of air upon entry into the first compressor stage;
relating the cooling air mass flow to the inlet air mass flow, thus obtaining a relative cooling air mass flow;
using said relative cooling air mass flow as an input for computing a cooling air control variable;
varying the cooling air mass flow dependent on said control variable.

14. The method of claim 13, the method further comprising the step of:
adjusting a throughflow of an adjustable throttling device in a cooling air duct of the cooling system dependent on said control variable.

15. The method of claim 13, the method further comprising the steps of:
bypassing a throttling point in a cooling air duct in a bypass duct;
arranging an adjustable throttling device in said bypass duct;
adjusting the throughflow of said adjustable throttling device dependent on the control variable.

16. The method of claim 13, the method further comprising the steps of:
bypassing a throttling point in a cooling air duct in a bypass duct;
placing an ejector in the bypass duct for driving the cooling air mass flow through the bypass duct;
operating said ejector by a.motive fluid flow;
adjusting the motive fluid flow dependent on the control variable.

17. The method of claim 13, the method further comprising the steps of:
arranging an entry point for a supplemental fluid downstream of a throttling point in the cooling air duct;
introducing a supplemental fluid at said entry point;
adjusting the flow of the supplemental fluid dependent on the control variable.

18. The method of claim 13, the method further comprising the steps of:
placing an ejector device in a cooling air duct for driving the cooling air mass flow through the cooling air duct;
operating the ejector with a motive fluid flow;
adjusting the motive fluid flow depending on the control variable.

19. The method of claim 13, the method further comprising the steps of:
equipping the gas turbine set with a high pressure cooling system and at least one lower pressure cooling system;
controlling the cooling air mass flow through at least one lower pressure cooling system.

20. The method of claim 13, wherein the cooling air mass flow through the high pressure cooling system is adjusted by means of a fixed throttling device, and the cooling air mass flow of at least one lower pressure cooling system is controlled depending on the control variable.

21. A method for controlling a cooling air mass flow in a cooling system of a gas turbine set, said method comprising the steps of:
compressing an air flow from a first pressure to a second pressure by a compressor, said compressor comprising multiple compressor stages;
extracting the cooling air mass flow at a bleed point;

quantifying the pressure at the bleed point;

quantifying the compressor outlet pressure;

relating the pressure at the bleed point to the compressor outlet pressure, thus obtaining a relative cooling air pressure;

using said relative cooling air pressure as an input for computing a cooling air control variable;

varying the cooling air mass flow dependent on said control variable.

22. The method of claim 21, the method further comprising the step of:

adjusting a throughflow of an adjustable throttling device in a cooling air duct of the cooling system dependent on said control variable.

23. The method of claim 21, the method further comprising the steps of:

bypassing a throttling point in a cooling air duct in a bypass duct;

arranging an adjustable throttling device in said bypass duct;

adjusting the throughflow of said adjustable throttling device dependent on the control variable.

24. The method of claim 21, the method further comprising the steps of:

bypassing a throttling point in a cooling air duct in a bypass duct;

placing an ejector in the bypass duct for driving the cooling air mass flow through the bypass duct;

operating said ejector by a motive fluid flow;

adjusting the motive fluid flow dependent on the control variable.

25. The method of claim 21, the method further comprising the steps of:

arranging an entry point for a supplemental fluid downstream of a throttling point in the cooling air duct;

introducing a supplemental fluid at said entry point;

adjusting the flow of the supplemental fluid dependent on the control variable.

26. The method of claim 21, the method further comprising the steps of:

placing an ejector device in a cooling air duct for driving the cooling air mass flow through the cooling air duct;

operating the ejector with a motive fluid flow;

adjusting the motive fluid flow depending on the control variable.

27. The method of claim 21, the method further comprising the steps of:

equipping the gas turbine set with a high pressure cooling system and at least one lower pressure cooling system;

controlling the cooling air mass flow through at least one lower pressure cooling system.

28. The method of claim 27, wherein the cooling air mass flow through the high pressure cooling system is adjusted by means of a fixed throttling device, and the cooling air mass flow of at least one lower pressure cooling system is controlled depending on the control variable.

29. A method for controlling a cooling air mass flow in a cooling system of a gas turbine set, said method comprising the steps of:

compressing an air flow from a first pressure to a second pressure by a compressor, said compressor comprising multiple compressor stages;

extracting the cooling air mass flow at a bleed point;

introducing the cooling air mass flow into the gas turbine set fluid flow at an entry point;

quantifying the pressure at the bleed point;

quantifying the pressure at the entry point;

relating the pressure at the bleed point to the pressure at the entry point, thus obtaining a relative cooling air pressure;

using said relative cooling air pressure as an input for computing a cooling air control variable;

varying the cooling air mass flow dependent on said control variable.

30. The method of claim 29, the method further comprising the step of:

adjusting a throughflow of an adjustable throttling device in a cooling air duct of the cooling system dependent on said control variable.

31. The method of claim 29, the method further comprising the steps of:

bypassing a throttling point in a cooling air duct in a bypass duct;

arranging an adjustable throttling device in said bypass duct;

adjusting the throughflow of said adjustable throttling device dependent on the control variable.

32. The method of claim 29, the method further comprising the steps of:

bypassing a throttling point in a cooling air duct in a bypass duct;

placing an ejector in the bypass duct for driving the cooling air mass flow through the bypass duct;

operating said ejector by a motive fluid flow;

adjusting the motive fluid flow dependent on the control variable.

33. The method of claim 29, the method further comprising the steps of:

arranging an entry point for a supplemental fluid downstream of a throttling point in the cooling air duct;

introducing a supplemental fluid at said entry point;

adjusting the flow of the supplemental fluid dependent on the control variable.

34. The method of claim 29, the method further comprising the steps of:

placing an ejector device in a cooling air duct for driving the cooling air mass flow through the cooling air duct;

operating the ejector with a motive fluid flow;

adjusting the motive fluid flow depending on the control variable.

35. The method of claim 29, the method further comprising the steps of:

equipping the gas turbine set with a high pressure cooling system and at least one lower pressure cooling system;

controlling the cooling air mass flow through at least one lower pressure cooling system.

36. The method of claim 35, wherein the cooling air mass flow through the high pressure cooling system is adjusted by means of a fixed throttling device, and the cooling air mass flow of at least one lower pressure cooling system is controlled depending on the control variable.

* * * * *